US012229849B2

(12) United States Patent
Low et al.

(10) Patent No.: US 12,229,849 B2
(45) Date of Patent: Feb. 18, 2025

(54) AVATAR IDENTITY PROTECTION USING STEGANOGRAPHY

(71) Applicant: VERIZON PATENT AND LICENSING INC., Basking Ridge, NJ (US)

(72) Inventors: Mun Wei Low, Irving, TX (US); Dante J. Pacella, Charles Town, WV (US); Manuel Enrique Caceres, Basking Ridge, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 216 days.

(21) Appl. No.: 18/046,272

(22) Filed: Oct. 13, 2022

(65) Prior Publication Data

US 2024/0127389 A1   Apr. 18, 2024

(51) Int. Cl.
G06T 1/00        (2006.01)
G06T 13/40       (2011.01)
H04L 9/08        (2006.01)

(52) U.S. Cl.
CPC ............ *G06T 1/0021* (2013.01); *G06T 13/40* (2013.01); *H04L 9/0833* (2013.01); *H04L 9/0869* (2013.01); *H04L 2209/608* (2013.01)

(58) Field of Classification Search
CPC ..... G06T 1/0021; G06T 13/40; H04L 9/0833; H04L 9/0869; H04L 2209/608; H04L 9/3247; H04L 9/50
See application file for complete search history.

(56) References Cited

U.S. PATENT DOCUMENTS

| 2015/0127434 A1* | 5/2015 | Davis, Jr. | ........... H04N 7/17318 |
| | | | 705/14.5 |
| 2023/0254300 A1* | 8/2023 | Silverstein | .............. H04L 63/08 |
| | | | 726/10 |

FOREIGN PATENT DOCUMENTS

| CN | 109960916 A | * | 7/2019 | ............. G06F 21/32 |
| CN | 110798433   | * | 12/2021 | ........... H04L 63/083 |
| CN | 110300112 B | * | 6/2022 | ........... H04L 63/064 |
| JP | 2006222788  | * | 8/2006 | ............... H04L 9/32 |
| JP | 2014170441  | * | 3/2013 | ............. G06F 21/44 |
| KR | 102427657 B1 | * | 8/2022 | ............... G06N 3/08 |

OTHER PUBLICATIONS

Nevriyanto et al.; "Image Steganography Using Combined of Discrete Wavelet Transform and Singular Value Decomposition for More Robustness and Higher Peak signal Noise Ratio"; 2018; ICECOS; p. 147-151 (Year: 2018).*

\* cited by examiner

*Primary Examiner* — Ryan R Yang

(57) ABSTRACT

In some aspects, the techniques described herein relate to a method including: generating, by a processor, verification data; encoding, by the processor, the verification data within a base avatar using a steganography algorithm to generate an augmented avatar; and transmitting, by the processor, the augmented avatar to a recipient.

20 Claims, 3 Drawing Sheets

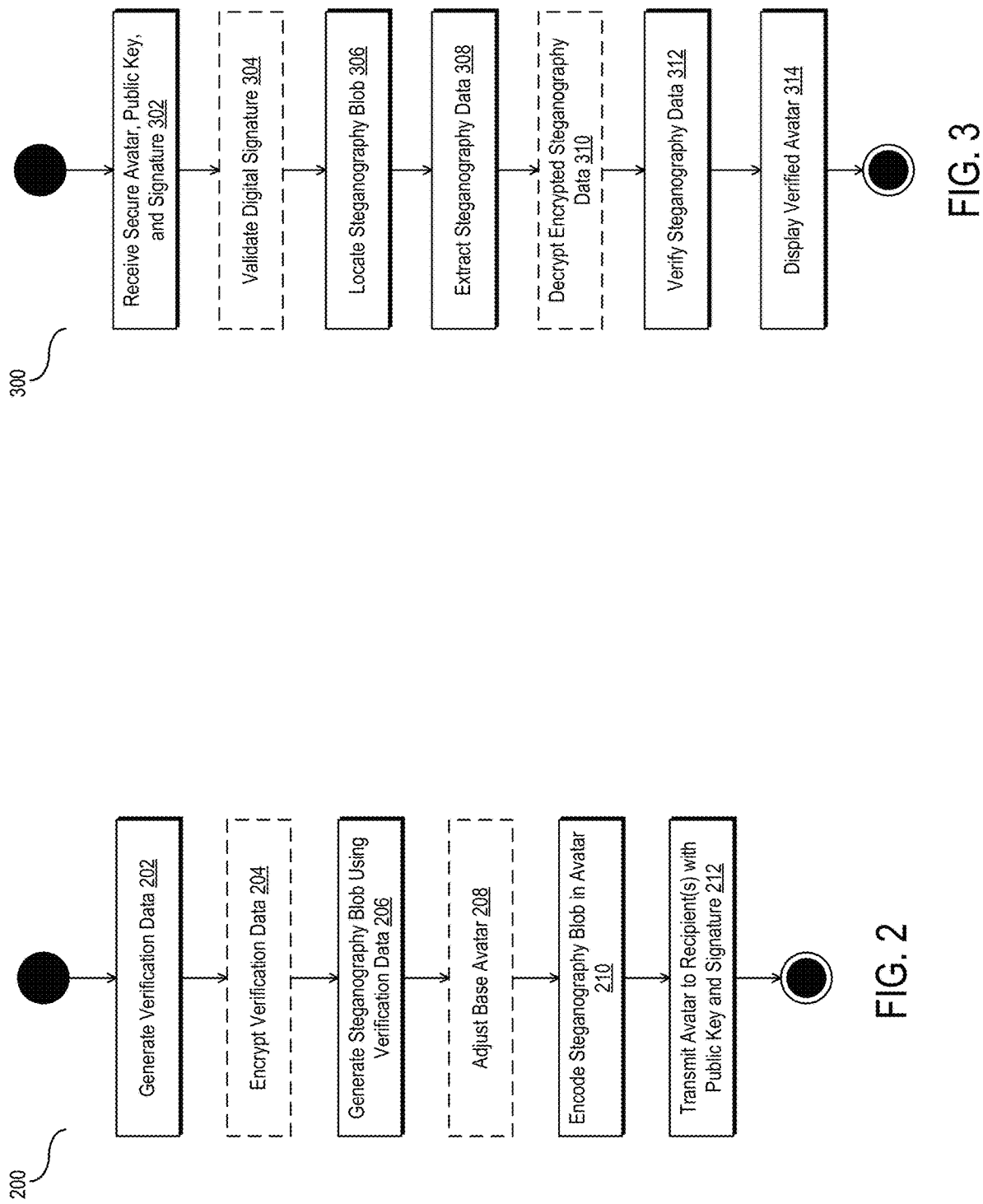

AVATAR IDENTITY PROTECTION USING STEGANOGRAPHY

BACKGROUND

In many Augmented Reality (AR) and virtual reality (VR) systems, users are represented by avatars in digital worlds. These avatars, however, can be cloned or replicated by other users. Thus, malicious users can "pose" as other users by replicating avatars. Further, even if such malicious users did not purport to have the identity of the original owner of the avatar, many such owners have an interest in ensuring that copies of avatars can be distinguished from the original avatar. Thus, even if malicious users did not purport to be the true owner of an avatar, they may purport to own a copied avatar.

BRIEF DESCRIPTION OF THE DRAWINGS

FIG. 2 is a flow diagram illustrating a method for generating a secure avatar.

FIG. 3 is a flow diagram illustrating a method for decoding and validating a secure avatar.

DETAILED DESCRIPTION

Figure 1:
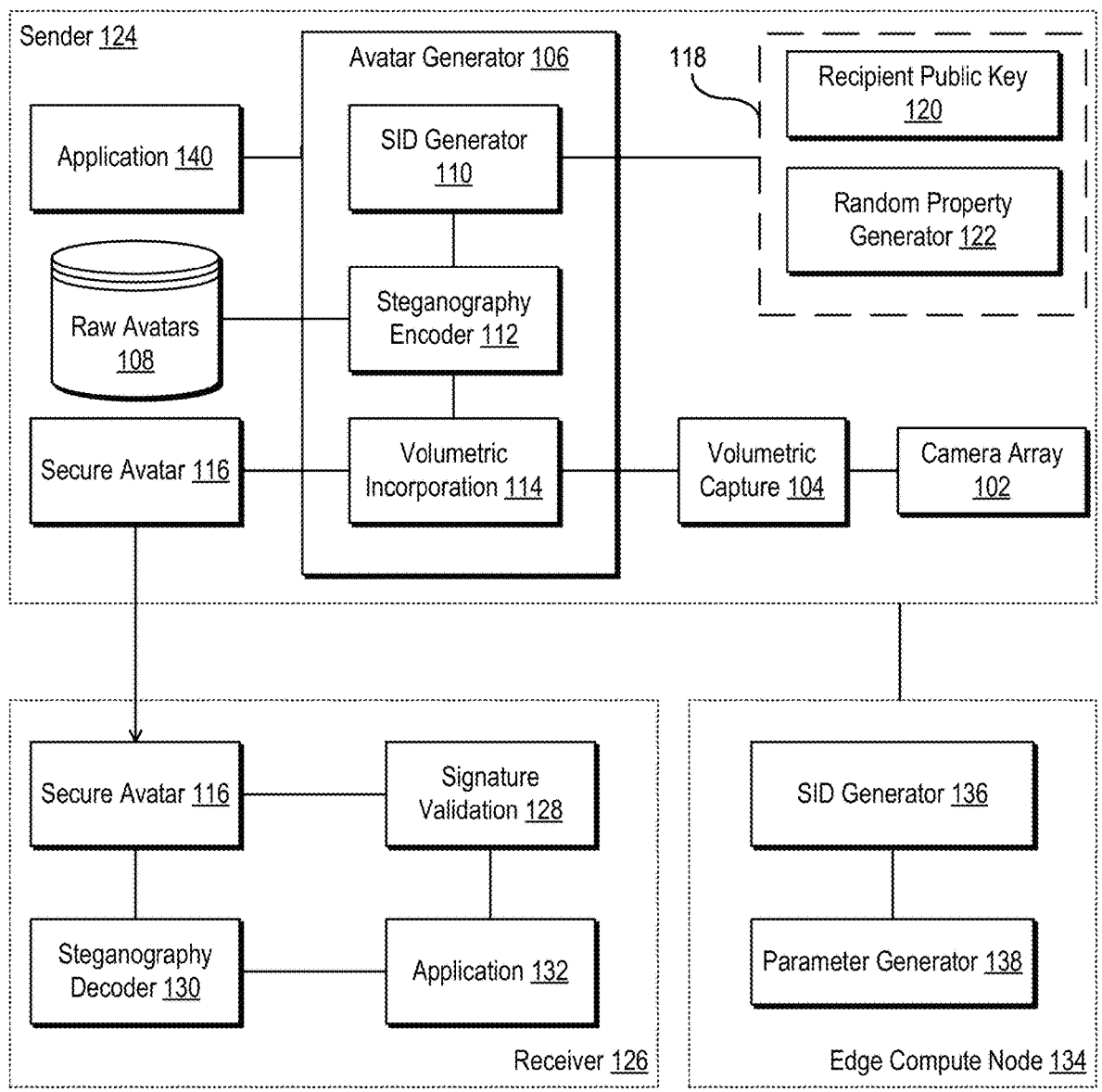
FIG. 1 is a block diagram illustrating a system for generating a secure avatar in an AR or VR application such as the metaverse.

In AR and VR applications, user identities are frequently represented solely via avatars and public key cryptography. Many such systems do not require, and explicitly eschew, authentication with a centralized system to verify identity. Frequently, avatars can be represented as blockchain-based non-fungible tokens (NFTs), which allow for the portability of avatars across metaverses, further eliminating the ability of a single entity to authenticate users.

In many systems, public key cryptography can be used to establish identity. Specifically, an asymmetric key pair can be a digital fingerprint of a user that generated the asymmetric key pair. Further, digital certificates can be used to verify a user's identity. A user can provide proof of authenticity to a certificate authority which, in turn, can sign the user's public key. This public key and corresponding private key can then be used as the user's identity. However, avatar generation in current systems does not rely on public key cryptography and is generally separate from identity. That is, standard graphical techniques are used to create avatars, and a user's actual identity is never incorporated into these techniques. As a result, any user may use any avatar to impersonate another avatar. While in some systems, verification of a digital certificate can be used to validate the identity of an avatar user, such an approach may not be feasible in all environments. As a brief example, if an avatar is recorded via video, there is no way to validate a digital certificate of the avatar by future users. Such a scenario represents a digital equivalent of impersonating and framing a user. If the recording depicts an illegal act, the true and innocent owner of the avatar may be improperly subject to fines or arrest. Further, users who copy avatars may not have an interest in impersonating the owner of the avatar but may simply wish to re-use the avatar without permission. Since the avatars encode no information regarding their ownership, there is simply no means to determine who the true owner of the avatar is. The following disclosure remedies these and other problems.

In some implementations, the techniques described herein may relate to a method executed by a processor that includes generating verification data and encoding the verification data within a base avatar using a steganography algorithm. The method can then generate a secure avatar from the augmented avatar by combining the augmented avatar with a volumetric capture of a user. Finally, the method may transmit the secure avatar to a recipient.

In some implementations, the verification data can include a public key of the recipient, and in some implementations, the public key of the recipient may be a group public key shared with at least one other recipient. In other implementations, the verification data includes appearance data associated with the base avatar. In some implementations, the appearance data may be related to an audiovisual property of the base avatar. In some implementations, the appearance data can include the color or shading of a portion of the base avatar. In other implementations, the appearance data can be generated using a random process. As used herein, a random process refers to either a random or pseudo-random process. In some of the implementations, the steganography algorithm can include one or more of a CMYK separation, discrete wavelet transform (DWT), peak signal-to-noise ratio (PSNR), fixed pattern noise (FPN), or photo response non-uniformity (PRNU) algorithm.

FIG. 1 is a block diagram illustrating a system for generating a secure avatar in an AR or VR application such as those employed in the metaverse.

System 100 includes a sender device 124, receiver device 126, and edge node 134. Each of these devices, in various embodiments, may coordinate to generate and transmit steganography-enhanced avatars for use in metaverse applications, as will be discussed in more detail herein. Further, each of the devices may comprise a general-purpose computing device such as that described with respect to FIG. 4. As one example, sender device 124 and receiver device 126 may comprise mobile, desktop, or similar devices, while edge node 134 may comprise one or more edge devices operated by a network operator.

Sender device 124 executes an application 140. The specific operations and displays of application 140 are not limiting and may include any type of metaverse, VR or AR application 140 that requires the use of avatars. Indeed, in many implementations, application 140 and application 132 of receiver device 126 may comprise different applications that can both process the same type of avatar described herein. In general, application 140 (and application 132) can include the capability of rendering and displaying an avatar as part of its operations.

In the illustrated embodiment, sender device 124 generates and sends a secure avatar 116 to the receiver device 126. The receiver device 126 may also be capable of generating a secure avatar and sending the secure avatar to sender device 124. Further, system 100 may include multiple senders and receivers beyond what is illustrated.

In an implementation, sender device 124 may include a camera array 102. In an implementation, the camera array 102 can include one or more camera devices. The camera devices may be image sensors such as charge-coupled devices or active-pixel sensors (e.g., complementary metal-oxide-semiconductor). In some implementations, camera array 102 can be configured such that a three-dimensional view of a human user (or another real-world object) can be captured (volumetric capture 104). As illustrated, camera array 102 can be physically co-located with sender device 124. However, in other implementations, an external camera array can be used to generate volumetric capture 104, and the resulting volumetric capture 104 can be received by the sender device 124. In some implementations, the use of camera array 102, volumetric capture 104, and volumetric incorporation phase 114 (discussed below) may be optional. In such implementations, the resulting avatar may thus be computer-generated and not modified based on a volumetric capture of the user. Further, in such implementations, an augmented avatar output by steganography encoder 112 may be transmitted to the receiver in lieu of the secure avatar 126 output by the volumetric incorporation phase 114.

Sender device 124 also includes (or can access) a set of raw avatar data in database 108. In some implementations, database 108 can store wearable assets or other types of avatar-specific data used to build an avatar. As will be described in more detail, avatar generator 106 can use volumetric capture 104 overlaid with avatar objects (e.g., clothing, glasses, etc.) to generate a three-dimensional avatar from the user's volumetric capture 104.

Sender device 124 includes an avatar generator 106 responsible for generating secure avatars for exchange with other users (via metaverse applications). Avatar generator 106 combines volumetric capture 104 with avatar objects from database 108 to generate a final three-dimensional avatar. Further, avatar generator 106 generates a steganographic identifier (SID) that is encoded within the image using a steganographic algorithm, enabling verification of the avatar by, for example, receiver 126.

In an implementation, avatar generator 106 includes SID generator 110. In an implementation, SID generator 110 accesses encoding data 118 and generates a steganography BLOB (binary large object) to be encoded in an avatar. Encoding data 118 can take various forms, which can be used alone or in combination. As a first example, encoding data 118 can include a recipient public key 120. In an implementation, recipient public key 120 can comprise a public key portion of an asymmetric key pair. In some implementations, the asymmetric key pair can be a Rivest—Shamir—Adleman (RSA) or Elliptic Curve Digital Signature Algorithm (ECDSA) key pair, although the specific algorithm is not limiting. In some implementations, recipient public key 120 can be a public key of a single recipient or user (e.g., receiver device 126). That is, only the recipient holds the corresponding private key. In other implementations, recipient public key 120 can comprise a group public key shared with other recipients such that multiple recipients can hold a corresponding private key (either the same private key or different compatible private keys). In some implementations, sender device 124 can obtain recipient public key 120 directly from the holder of the corresponding private key. In other implementations, sender device 124 can obtain recipient public key 120 from a certificate authority or other trusted entity.

In another implementation, the SID generator 110 can also receive appearance data from a random property generator 122. In some implementations, the appearance data can be related to the appearance of the avatar and included as part of the steganography BLOB. In some implementations, this appearance data can be generated according to a random process. The appearance data can cause the avatar generator 106 to modify the appearance of a base avatar. For example, the appearance data can change the color of an article of clothing or adjust the shading of a portion of the avatar. In some implementations, the appearance data can be generated according to a schedule, and that schedule can be included in the BLOB. For example, the appearance data can include a schedule of colors (e.g., unique colors for each day of the week) that an article of clothing of the avatar should be.

In some implementations, the steganography BLOB can be generated locally by the sender device 124. In another implementation, however, edge node 134 can be configured to generate the steganography BLOB. As such, edge node 134 may include a SID generator 136, which functions similarly to SID generator 110. The edge node 134 can also include a parameter generator 138, which can generate a public key, appearance property, or combination thereof similar to encoding data 118. In some implementations, avatar generator 106 can issue a request to the edge node 134 for the steganography BLOB, and 134 can generate such a steganography BLOB as described previously with respect to encoding data 118. In some implementations, edge node 134 can employ a generative adversarial network (GAN) that can randomly define the location of the steganography BLOB within an avatar.

The avatar generator 106 further includes a steganography encoder 112. In an implementation, the steganography encoder 112 encodes the steganography BLOB into an avatar from database 108. In some implementations, steganography encoder 112 can employ various techniques to encode the steganography BLOB into the avatar. In some implementations, steganography encoder 112 can use CMYK separation to hide the steganography BLOB in avatars where the sequence of data is only within a specific color plate or layer. For example, the steganography BLOB can be hidden within the black layer of an avatar. As another alternative, steganography encoder 112 can use Discrete Wavelet Transform (DWT) embedding, where the steganography BLOB is embedded in an avatar using a fixed size (e.g., $8x8$) blocking of the image, and then a three-stage decomposition of the cover image can be performed using low pass and high pass filters to each block, embedding the steganography BLOB into the LH3 portion of the block (the transforms result in LL, LH, HL, and HH sub-portions and the transformation can be repeated on each LL until it results in an LH3). In some implementations, DWT results in low detection, resistance to the destruction of data through compression, and moderate payload capacity. In yet another alternative, steganography encoder 112 can use Peak Signal to Noise Ratio (PSNR), pixel defects, fixed pattern noise (FPN), Photo Response Non-Uniformity (PRNU), as well as compression differences in regions of an avatar.

The avatar generator 106 further includes a volumetric incorporation phase 114. During volumetric incorporation phase 114, avatar generator 106 can combine the volumetric capture 104 of the user with the steganography-encoded avatar output by steganography encoder 112 to generate a final secure avatar 116. Specific details of applying an avatar to a volumetric capture 104 are not described in detail herein, and known techniques may be used to combine an avatar with a volumetric representation of a user.

As illustrated, sender device 124 can send the secure avatar 116 to receiver device 126. The receiver device 126 may execute its own application 132, which may initiate and receive the secure avatar 116 for display. In some implementations, sender device 124 can send the secure avatar 116 along with other public-key infrastructure (PKI) data, such as a public key of sender device 124 as well as a digital signature generated using a corresponding private key of sender device 124. In some implementations, receiver device 126 can validate the digital signature using the public key of the sender via a signature validation process 128. In some implementations, any well-known digital signature process can be used, and the details of validating a digital signature are not intended to be limiting.

In an implementation, the receiver device 126 can implement a steganography decoder 130, which can extract the steganography BLOB from the secure avatar 116. In some implementations, receiver device 126 may receive the location of the steganography BLOB in a variety of ways (described herein). Once the receiver device 126 identifies the location of the steganography BLOB (e.g., a range of pixels or location of the steganography BLOB with respect to an avatar), the receiver device 126 can extract the encoded data and decode the data. The receiver device 126 can determine if the decoded data is valid. For example, if the encoded steganography BLOB is a public key of the receiver device 126 (or a shared group public key that the receiver device 126 is a member of), the receiver device 126 can verify that the encoded public key matches the expected public key. If, as another example, the encoded steganography BLOB is appearance data (e.g., an avatar's clothing is yellow on the current day), receiver device 126 can inspect the avatar to confirm that the avatar matches the appearance data.

In some implementations, the receiver device 126 can employ an out-of-band (OOB) process to identify the location of the steganography BLOB. For example, in some implementations, sender device 124 can manually tell the receiver device 126 where to search for the steganography BLOB. In this implementation, the application may allow for voice, video, and/or text communications which allow users to instruct each other where to search for the steganography BLOB. In another implementation, a trusted third-party service can be used to programmatically provide the location of the steganography BLOB to the receiver device 126. For example, edge node 134 may be used to provide the location of the steganography BLOB. In another example, sender device 124 may include the location when transmitting the secure avatar 116.

These and other aspects of generating secure avatar 116 are described more fully in the following flow diagrams.

FIG. 2 is a flow diagram illustrating a method for generating a secure avatar.

In step 202, method 200 can include generating verification data.

In some implementations, step 202 can be executed after initiating an avatar generator process. In some implementations, a processor or computing device (e.g., such as that depicted in FIG. 4) can initiate method 200 in response to a request for an avatar. In some implementations, a recipient may initiate such a request via a metaverse, VR, or AR application. In other implementations, the metaverse, VR, or AR application may initiate the request on its own accord as part of displaying a virtual world. In other implementations, a user may initiate method 200 itself to provide its avatar to others.

In general, an avatar will include an audiovisual representation of the user. In some implementations, this audiovisual representation can be a two-dimensional image, a three-dimensional image, or a three-dimensional volumetric representation of the user. The avatar may be capable of moving, speaking, or performing various other functions when displayed by a recipient device. In some implementations, the avatar can be provided along with other OOB data such as voice or text chat between users.

In some implementations, a sending device can generate an avatar to send to a recipient as part of participating in a virtual world. In some implementations, method 200 can be executed once. In other implementations, method 200 can be executed each time an avatar is transmitted from a sender to a recipient. In other implementations, method 200 can be executed on a periodic basis, and the resulting secure avatar can be cached in between executions of method 200.

In some implementations, a secure avatar can combine a base avatar with a volumetric capture of the user generating the avatar. As discussed, use of volumetric capture may be optional. For example, the base avatar may include clothing, accessories, or other objects to display in accordance with the volumetric capture. In some implementations, the base avatar can be represented as three-dimensional models of such objects. In other implementations, the base avatar can be represented as two-dimensional images that are converted to three-dimensional objects based on the volumetric capture.

The specific form of the verification data may vary depending on the implementation, and, indeed, various implementations can be combined to form the verification. Two main implementations of verification data are described herein: PKI-based verification data and pattern injection verification data.

In the first implementation, the verification data can comprise PKI-based data. In some implementations, the verification data can be a public key portion of an asymmetric key pair (e.g., RSA or ECDSA key pair). In some implementations, the verification data can be a public key of the recipient, while in other implementations, the public key can be a group public key shared with the targeted recipient and at least one other recipient. Based on the specific asymmetric algorithm, these public keys will comprise fixed-length arbitrary data generated according to the asymmetric key generation algorithm. In some implementations, the recipient (or group member) can share these public keys freely in an OOB fashion (e.g., via a third party, directly with the sender, etc.). Since public keys are publicly shareable without compromising the integrity of a PKI system, no limit is placed on how a sender obtains such keys. Generally, however, the sender will verify the recipient and confirm that it obtains the appropriate key. In some implementations, the application can provide a key-sharing facility that allows users to freely exchange public keys during interactions within a virtual world.

In a second implementation, the verification data can be appearance data associated with the base avatar. In some implementations, the appearance data can be an audiovisual property of the base avatar. For example, the audiovisual property can be one of a color or shading of a portion of the base avatar. In some implementations, the appearance data can be generated using a random or pseudo-random process. In general, any audiovisual aspect of a base avatar can be associated with a property (e.g., color, shading, hue, saturation, tint, timbre, etc.). Each of these properties may be adjustable. For example, a shirt color of a base avatar can be represented as an RGB value which can be read and/or adjusted accordingly. Similarly, objects can include gradient or transparency properties that can be adjusted. In some implementations, in step 202, method 200 can include setting such a property (or multiple properties) and recording the changes as the verification data. In some implementations, the verification can be stored as a map, hash, or similar data structure that maps aspects of the base avatar with an expected value. In some implementations, the verification data can also include a schedule that provides an exhaustive list of property values based on underlying conditions. For example, a property value for each day of the week can be used as the schedule (e.g., red shirt on Monday, blue pants on Tuesday, etc.).

In a third implementation, either the first or second implementations above can be executed by an edge node of a cellular network. In this implementation, the sender can transmit a request to the edge node to return the verification data. In response, the edge node can perform similar processes to generate the verification data (e.g., PKI data or appearance data).

In each of the implementations, the sender device can include additional data, as deemed useful, to secure the avatar. For example, the sender device can include a timestamp or monotonic counter value to ensure that the verification data is not able to be replayed. In other implementations, biometric measurements of the user (e.g., recording during the volumetric capture can also be embedded in the verification data).

In step 204, method 200 can include encrypting the verification data.

As indicated by the dashed lines, step 204 may be optional and used to further increase the security of the verification data. In one implementation, method 200 can encrypt the verification data using any existing encryption algorithm. In some implementations, method 200 can encrypt the verification data using the user's private key. Thus, the recipient must decrypt the verification with the sending user's public key.

In other implementations, method 200 can encrypt the verification data using a public key of the recipient. In some implementations, this public key can be a user's individual public key. However, in other implementations, the public key can be a shared group public key, as discussed above. In these implementations, the recipient will use their private key (or the group private key) to decrypt the verification data.

In some implementations, the sender can doubly encrypt the data first using its own private key and then using the recipient public key (or shared group public key). The order of these encryptions may be in any order. Thus, in such an implementation, the recipient must have both the correct private key and the sender's public key.

In step 206, method 200 can include generating a steganography BLOB based on the verification data. In some implementations, step 206 can include converting the verification data into a format usable with a steganography algorithm. For example, step 206 can include converting the verification data into a binary bitstream or another suitable format.

In step 208, method 200 can include adjusting a base avatar. As indicated by the dashed lines, step 208 may be optional.

As discussed above, in some implementations, the verification data can include appearance data that is related to an audiovisual property of the base avatar. As provided in previous examples, one example of such a property is the color of a base avatar's clothing (e.g., "red pants" or "blue shirt"). A base avatar may include various adjustable properties that can be set prior to applying the base avatar to the volumetric capture. For example, the base avatar may have corresponding color settings for a pair of pants and a shirt. As such, in step 208, method 200 can use the verification data to adjust these settings of the base avatar to generate an adjusted avatar that corresponds to appearance data in the verification data. In other implementations, step 208 can also include modifying the avatar directly. For example, the shading of the avatar can be adjusted based on a shading value parameter in the appearance data. Such an adjustment can be made using image processing techniques on the actual image data of the base avatar itself.

In step 210, method 200 can include encoding the verification data within a base avatar using a steganography algorithm to generate an augmented avatar.

In some implementations, step 210 can include using various techniques to encode the steganography BLOB into the avatar. In some implementations, step 210 can include using CMYK separation to hide the steganography BLOB in avatars where the sequence of data is only within a specific color plate or layer. For example, the steganography BLOB can be hidden within the black layer of an avatar. As another alternative, step 210 can include using Discrete Wavelet Transform (DWT) embedding, where the steganography BLOB is embedded in an avatar using a fixed size (e.g., 8x8) blocking of the image, and then a three-stage decomposition of the cover image can be performed using low pass and high pass filters to each block, embedding the steganography BLOB into the LH3 portion of the block (the transforms result in LL, LH, HL, and HH sub-portions and the transformation can be repeated on each LL until it results in an LH3). In some implementations, DWT results in low detection, resistance to the destruction of data through compression, and moderate payload capacity. In yet another alternative, step 210 can include using PSNR, pixel defects, FPN, PRNU, as well as compression differences in regions of an avatar to encode the steganography BLOB. The resulting augmented avatar thus will include any adjustments made in step 208 as well as encoded verification data embedded within the augmented avatar using a steganography algorithm.

In some implementations, the steganography BLOB can be encoded in an entire avatar, that is, the bits of the steganography BLOB can be distributed throughout the pixels of the underlying avatar. In other embodiments, however, the steganography BLOB can be isolated to a region of the avatar. For example, the steganography BLOB may be encoded within the shirt, facial features, or other areas of the avatar. In such an implementation, the location of the steganography BLOB will be provided to the receiver to enable the receiver to identify the steganography BLOB.

In some embodiments, step 210 can further include generating a secure avatar by combining the augmented avatar with a volumetric capture of a user. As discussed above, a volumetric capture of a user may be obtained using a camera array or similar capture technique. Then, method 200 can include applying the augmented avatar to the volumetric capture to generate a three-dimensional secure avatar that includes the steganography BLOB (and thus verification) as encoded within the augmented avatar.

In step 212, method 200 can include transmitting the secure avatar to a recipient. In some implementations, method 200 can execute as part of responding to requests for avatars or otherwise as part of a process that provides avatars to other users. In some implementations, this process can be executed by a metaverse, VR, or AR application executed by both the sender and recipient. In some implementations, method 200 can include transmitting the secure avatar over a network to the recipient for rendering on the recipient computing device (as described in FIG. 3).

In some implementations, step 212 can also include a sender transmitting a public key and/or digital signature to the recipient along with the secure avatar. In some implementations, the public key may include the user's public key or a public key the user has registered with a third-party (e.g., certificate authority). In some implementations, the digital signature may be generated using the private key corresponding to the public key sent in step 212. In some implementations, the digital signature can be generated by signing the steganography BLOB encoded in step 210. As such, when the recipient identifies and decodes the steganography BLOB, the recipient can verify the digital signature using the public key included with the avatar. In some implementations, the public key and private key used in step 212 can comprise RSA, ECDSA, or similar keys. In other embodiments, biometric data can be used to generate a digital signature. In some implementations, biometric data can be captured from a wearable device (e.g., smart watch, smart ring, etc.) that can capture biometrics can be used to generate a digital signature. In some implementations, the biometrics can be used to generate a repeatable public key and private key from the biometrics, thus eliminating the need to store such keys. As such, after capturing and verifying user biometrics, method 200 may generate a corresponding public key and private key, provide the public key to the recipient, and use the private key to generate a digital signature of the steganography BLOB.

FIG. 3 is a flow diagram illustrating a method for decoding and validating a secure avatar. In some implementations, method 300 can be executed by a recipient computing device or processor upon receive of a secure avatar from a sender device (generated using method 200).

In step 302, method 300 can include receiving a secure avatar from a sending device. In some implementations, step 302 can also include receiving the sending device's public key and a digital signature, as discussed in step 212. In some implementations, method 300 may receive the aforementioned items while rendering and displaying a metaverse, VR, or AR application.

In step 304, method 300 can include validating the digital signature received in step 302. As indicated by the dashed lines, in some implementations, step 304 may be optional and only performed if a digital signature and public key are received from the sending device. Various existing algorithms for validating a digital signature may be used, and the disclosure is not limited as such. In brief, method 300 can compute a hash of the secure avatar and compare the hash to the decrypted version of the digital signature to determine if the signature matches the hash. The decrypted version may be generated by decrypting the digital signature using the public key received in step 302.

In step 306, method 300 can include locating the steganography blog within the secure avatar.

In some implementations, the steganography BLOB may be encoded within the entire avatar. For example, each pixel of the avatar may be encoded to include the steganography BLOB. Certainly, the steganography BLOB may be smaller than the total number of pixels in an avatar. In such a scenario, unused pixels may simply be encoded with zero or one values while pixels, including the steganography BLOB, are encoded with meaningful data.

In other implementations, the steganography BLOB may only be encoded in a region of the avatar (e.g., eye, shirt, etc.). In these implementations, the receiving device must first identify which region of the avatar should be analyzed to decode the steganography BLOB. In such implementations, the receiver device may employ an OOB process to perform this identification. For example, in some implementations, the sending device may send an OOB message (via voice, text, etc.) to the receiver device manually identifying which region includes the steganography BLOB. In other implementations, a trusted third-party service may provide the region in which to identify the steganography BLOB to the receiver device. In either scenario, the region may comprise a geometric region (e.g., pixels zero through N) of the secure avatar or may comprise a textual description of the region (e.g., eyes or shirt). The receiver device can then isolate the identified region of the secure avatar for further processing.

In step 308, method 300 can include extracting the steganography BLOB from the secure avatar. In some implementations, step 308 can use a corresponding steganography decoding algorithm (e.g., CMYK, PSNR, etc.) to extract the encoded data from each pixel of the secure avatar or region thereof. As one example, using CMYK separation, step 308 can include reading the final bits of each pixel of a region to re-build the encoded steganography data. In some implementations, step 308 can include unmarshalling the encoded steganography data to obtain the decoded steganography data. In some optional implementations, in step 310, method 300 may also include decrypting the steganography BLOB if it was encrypted by the receiver. For example, as discussed, the steganography BLOB may include the recipient's public key (or a shared group public key). In some implementations, this public key may be encrypted using the same public key (or using the private key of the sender). In either event, the receiver device may load the appropriate decryption key (e.g., the private key corresponding to the user's public key or group public key) and decrypt the steganography BLOB.

Finally, in step 312, method 300 can include verifying the decoded (and optionally decrypted) steganography BLOB.

If the steganography BLOB includes a recipient's public key (or shared group public key), step 312 can include comparing the public key in the steganography B LOB to the expected public key (e.g., the user's held public key or shared group public key).

Alternatively, or in conjunction with the foregoing, if the steganography BLOB includes appearance data related to the audiovisual property of the secure avatar, step 312 can include parsing the appearance data and analyzing the secure avatar to confirm that the secure avatar matches the appearance data. For example, if the appearance data indicates that a shirt of the secure avatar should be yellow, method 300 can include performing image analysis on a region of the secure avatar including the shirt to confirm that yellow is predominant in the secure avatar.

Finally, in step 314, method 300 can include displaying the verified secure avatar. In some implementations, a metaverse, VR, or AR application can display the secure avatar, including updating the secure avatar's position based on movements of the sending device. In some implementations, method 300 can display an indicator or icon indicating that the secure avatar was verified using the aforementioned steps to enable a higher degree of trust in such metaverse, VR, or AR applications.

Figure 4:
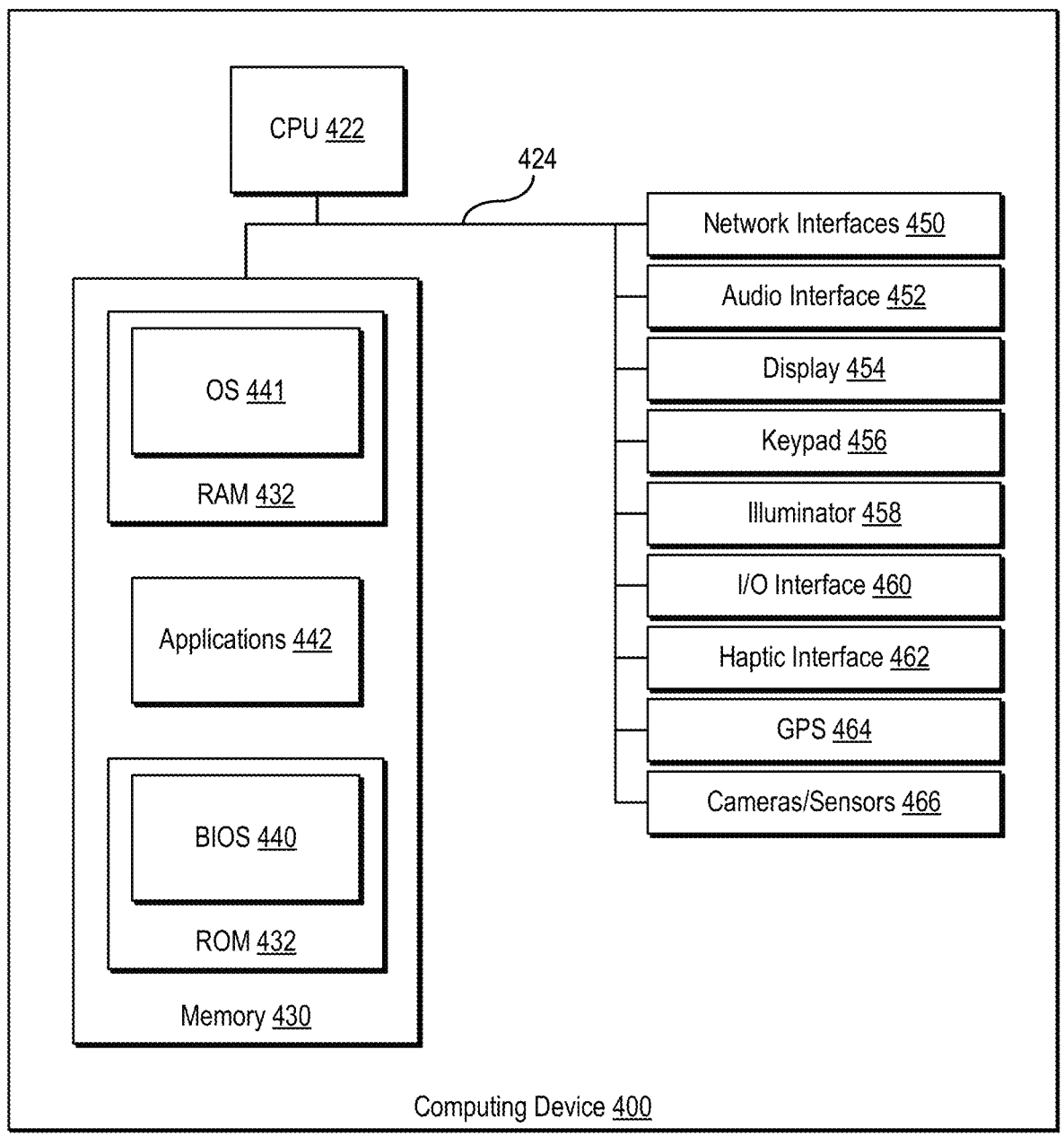
FIG. 4 is a block diagram of a computing device.

FIG. 4 is a block diagram of a computing device.

The computing device 400 may include more or fewer components than those shown in FIG. 4, depending on the deployment or usage of the computing device 400. For example, a server computing device, such as a rack-mounted server, may not include an audio interface 452, display 454, keypad 456, illuminator 458, haptic interface 462, Global Positioning System receiver 464, or sensors 466 (e.g., camera, temperature sensor, etc.). Some devices may include additional components not shown, such as graphics processing unit (GPU) devices, cryptographic coprocessors, artificial intelligence (AI) accelerators, or other peripheral devices.

As shown in the figure, the computing device 400 includes a processor, such as central processing unit (CPU) 822 in communication with a mass memory 430 via a bus 424. The computing device 400 also includes a network interface 450, an audio interface 452, a display 454, a keypad 456, an illuminator 458, an input/output interface 460, a haptic interface 462, a Global Positioning System receiver 464 and cameras or sensors 466 (e.g., optical, thermal, or electromagnetic sensors). Computing device 400 can include sensors 466. The positioning of the sensors 466 on the computing device 400 can change per computing device 400 model, per computing device 400 capabilities, and the like, or some combination thereof.

In some embodiments, the CPU 422 may comprise a general-purpose processor. The CPU 422 may comprise a single-core or multiple-core processor. The CPU 422 may comprise a system-on-a-chip (SoC) or a similar embedded system or processor. In some embodiments, a GPU may be used in place of, or in combination with, a CPU 422. Mass memory 430 may comprise a dynamic random-access memory (DRAM) device, a static random-access memory device (SRAM), or a Flash (e.g., NAND Flash) memory device. In some embodiments, mass memory 430 may comprise a combination of such memory types. In one embodiment, the bus 424 may comprise a Peripheral Component Interconnect Express (PCIe) bus. In some embodiments, the bus 424 may comprise multiple busses instead of a single bus.

Mass memory 430 illustrates another example of computer storage media for the storage of information such as computer-readable instructions, data structures, program modules, or other data. Mass memory 430 stores a basic input/output system, BIOS 440, for controlling the low-level operation of the computing device 400. The mass memory also stores an operating system 441) for controlling the operation of the computing device 400.

Applications 442 may include computer-executable instructions which, when executed by the computing device 400, perform any of the methods (or portions of the methods) described previously in the description of the preceding figures. In some embodiments, the software or programs implementing the method embodiments can be read from a hard disk drive (not illustrated) and temporarily stored in RAM 432 by CPU 422. CPU 422 may then read the software or data from RAM 432, process them, and store them to RAM 432 again.

The computing device 400 may optionally communicate with a base station (not shown) or directly with another computing device. Network interface 450 is sometimes known as a transceiver, transceiving device, or network interface card (NIC).

The audio interface 452 produces and receives audio signals such as the sound of a human voice. For example, the audio interface 452 may be coupled to a speaker and microphone (not shown) to enable telecommunication with others or generate an audio acknowledgment for some action. Display 454 may be a liquid crystal display (LCD), gas plasma, light-emitting diode (LED), or any other type of display used with a computing device. Display 454 may also include a touch-sensitive screen arranged to receive input from an object such as a stylus or a digit from a human hand.

Keypad 456 may comprise any input device arranged to receive input from a user. Illuminator 458 may provide a status indication or provide light.

The computing device 400 also comprises an input/output interface 460 for communicating with external devices, using communication technologies, such as USB, infrared, Bluetooth™, or the like. The haptic interface 462 provides tactile feedback to a user of the client device.

The Global Positioning System receiver 464 can determine the physical coordinates of the computing device 400 on the surface of the Earth, which typically outputs a location as latitude and longitude values. Global Positioning System receiver 464 can also employ other geo-positioning mechanisms, including, but not limited to, triangulation, assisted GPS (AGPS), E-OTD, CI, SAI, ETA, BSS, or the like, to further determine the physical location of the computing device 400 on the surface of the Earth. In one embodiment, however, the computing device 400 may communicate through other components, provide other information that may be employed to determine a physical location of the device, including, for example, a MAC address, IP address, or the like.

The present disclosure has been described with reference to the accompanying drawings, which form a part hereof, and which show, by way of non-limiting illustration, certain example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware, or any combination thereof (other than software per se). The following detailed description is, therefore, not intended to be taken in a limiting sense.

Throughout the specification and claims, terms may have nuanced meanings suggested or implied in context beyond an explicitly stated meaning. Likewise, the phrase "in some embodiments" as used herein does not necessarily refer to the same embodiment and the phrase "in another embodiment" as used herein does not necessarily refer to a different embodiment. It is intended, for example, that claimed subject matter include combinations of example embodiments in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures, or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for the existence of additional factors not necessarily expressly described, again, depending at least in part on context.

The present disclosure has been described with reference to block diagrams and operational illustrations of methods and devices. It is understood that each block of the block diagrams or operational illustrations, and combinations of blocks in the block diagrams or operational illustrations, can be implemented by means of analog or digital hardware and computer program instructions. These computer program instructions can be provided to a processor of a general-purpose computer to alter its function as detailed herein, a special purpose computer, ASIC, or other programmable data processing apparatus, such that the instructions, which execute via the processor of the computer or other programmable data processing apparatus, implement the functions/acts specified in the block diagrams or operational block or blocks. In some alternate implementations, the functions/acts noted in the blocks can occur out of the order noted in the operational illustrations. For example, two blocks shown in succession can in fact be executed substantially concurrently or the blocks can sometimes be executed in the reverse order, depending upon the functionality/acts involved.

For the purposes of this disclosure, a non-transitory computer-readable medium (or computer-readable storage medium/media) stores computer data, which data can include computer program code (or computer-executable instructions) that is executable by a computer, in machine-readable form. By way of example, and not limitation, a computer-readable medium may comprise computer-readable storage media, for tangible or fixed storage of data, or communication media for transient interpretation of code-containing signals. Computer-readable storage media, as used herein, refers to physical or tangible storage (as opposed to signals) and includes without limitation volatile and non-volatile, removable, and non-removable media implemented in any method or technology for the tangible storage of information such as computer-readable instructions, data structures, program modules or other data. Computer-readable storage media includes, but is not limited to, RAM, ROM, EPROM, EEPROM, flash memory or other solid state memory technology, optical storage, cloud storage, magnetic storage devices, or any other physical or material medium which can be used to tangibly store the desired information or data or instructions and which can be accessed by a computer or processor.

In the preceding specification, various example embodiments have been described with reference to the accompanying drawings. However, it will be evident that various modifications and changes may be made thereto, and additional embodiments may be implemented without departing from the broader scope of the example embodiments as set forth in the claims that follow. The specification and drawings are accordingly to be regarded in an illustrative rather than restrictive sense.

We claim:

1. A method comprising:
   generating, by a processor, verification data, the verification data comprising appearance data and a cryptographic key;
   encoding, by the processor, the verification data within a base avatar using a steganography algorithm to generate an augmented avatar by distributing bits of the cryptographic key and appearance data in pixels of the base avatar;
   adjusting, by the processor, at least one property of the base avatar according the appearance data; and
   transmitting, by the processor, the augmented avatar to a recipient.

2. The method of claim 1, wherein the cryptographic key comprises a public key of the recipient.

3. The method of claim 2, wherein the public key of the recipient comprises a group public key shared with at least one other recipient.

4. The method of claim 1, wherein the appearance data is related to an audiovisual property of the base avatar.

5. The method of claim 1, wherein the appearance data comprises one of a color or shading of a portion of the base avatar.

6. The method of claim 1, wherein the appearance data is generated using a random or pseudo-random process.

7. The method of claim 1, wherein the steganography algorithm comprises one or more of a CMYK separation, discrete wavelet transform (DWT), peak signal-to-noise ratio (PSNR), fixed pattern noise (FPN), or photo response non-uniformity (PRNU) algorithm.

8. A non-transitory computer-readable storage medium for tangibly storing computer program instructions capable of being executed by a computer processor, the computer program instructions defining steps of:
   generating, by the computer processor, verification data, the verification data comprising a combination of appearance data and a cryptographic key;
   encoding, by the computer processor, the verification data within a base avatar using a steganography algorithm to generate an augmented avatar by distributing bits of the cryptographic key and appearance data in pixels of the base avatar;
   adjusting, by the computer processor, at least one property of the base avatar according to the appearance data; and
   transmitting, by the computer processor, the augmented avatar to a recipient.

9. The non-transitory computer-readable storage medium of claim 8, wherein the cryptographic key comprises a public key of the recipient.

10. The non-transitory computer-readable storage medium of claim 9, wherein the public key of the recipient comprises a group public key shared with at least one other recipient.

11. The non-transitory computer-readable storage medium of claim 8, wherein the appearance data is related to an audiovisual property of the base avatar.

12. The non-transitory computer-readable storage medium of claim 8, wherein the appearance data comprises one of a color or shading of a portion of the base avatar.

13. The non-transitory computer-readable storage medium of claim 8, wherein the appearance data is generated using a random process.

14. The non-transitory computer-readable storage medium of claim 8, wherein the steganography algorithm comprises one or more of a CMYK separation, discrete wavelet transform (DWT), peak signal-to-noise ratio (PSNR), fixed pattern noise (FPN), or photo response non-uniformity (PRNU) algorithm.

15. A device comprising:
   a processor configured to:
      generate verification data, the verification data comprising a combination of appearance data and a cryptographic key;
      encode the verification data within a base avatar using a steganography algorithm to generate an augmented avatar by distributing bits of the cryptographic key and appearance data in pixels of the base avatar;
      adjusting, by the processor, at least one property of the base avatar according to the appearance data; and
      transmit the augmented avatar to a recipient.

16. The device of claim 15, wherein the cryptographic key comprises a public key of the recipient.

17. The device of claim 16, wherein the public key of the recipient comprises a group public key shared with at least one other recipient.

18. The device of claim 15, wherein the appearance data is related to an audiovisual property of the base avatar.

19. The device of claim 15, wherein the appearance data comprises one of a color or shading of a portion of the base avatar.

20. The device of claim 15, wherein the appearance data is generated using a random or pseudo-random process.

* * * * *